(12) United States Patent
Sharma et al.

(10) Patent No.: US 8,954,839 B2
(45) Date of Patent: Feb. 10, 2015

(54) CONTRACT AUTHORING SYSTEM AND METHOD

(76) Inventors: Sachin Sharma, Cranbury, NJ (US);
Shawn Fernandes, Mumbai (IN)

( * ) Notice: Subject to any disclaimer, the term of this patent is extended or adjusted under 35 U.S.C. 154(b) by 102 days.

(21) Appl. No.: 13/178,560

(22) Filed: Jul. 8, 2011

(65) Prior Publication Data

US 2012/0297296 A1 Nov. 22, 2012

(51) Int. Cl.
G06F 17/00 (2006.01)
G06Q 10/10 (2012.01)
G06Q 50/18 (2012.01)

(52) U.S. Cl.
CPC .............. *G06Q 10/10* (2013.01); *G06Q 50/18* (2013.01)
USPC ........... 715/221; 715/222; 715/223; 715/224; 715/225; 715/226; 715/230; 715/810; 715/812

(58) Field of Classification Search
CPC ....... G06F 17/243; G06F 9/4875; G06F 8/33; G06F 8/43
USPC .......................... 715/221–226, 810, 230, 812
See application file for complete search history.

(56) References Cited

U.S. PATENT DOCUMENTS

| | | | |
|---|---|---|---|
| 2009/0204881 A1* | 8/2009 | Murthy et al. | 715/226 |
| 2010/0223543 A1* | 9/2010 | Marston | 715/224 |
| 2012/0159300 A1* | 6/2012 | Vincent, III | 715/222 |
| 2012/0179961 A1* | 7/2012 | Stollman | 715/243 |

* cited by examiner

*Primary Examiner* — Quoc A Tran
(74) *Attorney, Agent, or Firm* — Preston Smirman; Smirman IP Law, PLLC

(57) ABSTRACT

A computer based system and method for contract authoring. The method can receive an external contract document in electronic form, wherein the external contract document comprises a plurality of text portions relating to a plurality of contract component types, respectively. The method can accessing a knowledge base describing a plurality of text patterns which identify with the plurality of the contract component types, respectively. Moreover, the method can process the external contract document utilizing the knowledge base to automatically identify the plurality of the contract component types for the plurality of the text portions in the contract document, respectively.

14 Claims, 6 Drawing Sheets

CONTRACT AUTHORING SYSTEM AND METHOD

CROSS-REFERENCES TO RELATED APPLICATIONS

This present application claims priority to the Indian Patent Application No. 1480/MUM/2011, titled "Contract Authoring System and Method", filed on May 16, 2011; which is herein incorporated by reference.

BACKGROUND OF THE INVENTION

The present invention is generally related to computer based system and method for contract authoring. Contracts are often required in business-to-business transactions. As merely example, contracts are often required during procurement of materials and services. As another example, contracts are often required during sales process. As a result, enhanced techniques for contract authoring are desirable, which can facilitate business functions involving contracts run efficiently. The present invention provides such techniques.

SUMMARY OF THE INVENTION

It is an object of the present invention to provide computer based system and method for contract authoring. More particularly, the present invention provides techniques for contract authoring which are based on the contract documents which are received from external parties. For example, these contract documents can be provided by the supplier (for procurement contract), the customer (for sales contract), etc.

In a specific embodiment of the present invention, a computer based system for contract authoring is provided. The system comprises a processor unit. The system also comprises a computer readable medium storing instructions executable by the processor unit to perform the step of receiving an external contract document in electronic form. The external contract document can comprise a plurality of text portions relating to a plurality of contract component types, respectively. Any contract component type can be a contract title, a section, a clause title, or a clause text. Moreover, the instructions are executable to perform the steps of accessing a knowledge base describing a plurality of text patterns which identify with the plurality of the contract component types, respectively; and processing the external contract document utilizing the knowledge base to automatically identify the plurality of the contract component types for the plurality of the text portions in the contract document, respectively. The instructions are also executable to perform the steps of displaying the external contract document on a computer screen; and displaying indication of the plurality of the contract component types that are identified and that are associated with the plurality of the text portions in the contract document, respectively.

The present invention also provides associated methods for information extraction from the external contract document. Method and system for authoring the new contract document based upon the extracted information from the external contract document are also provided.

Conventionally, the computer assisted contract authoring techniques utilize pre-existing contract templates provided in the computer system. These conventional techniques have a drawback that they cannot utilize the contract documents which are received from the external parties as basis to author new contracts, because the templates for the external contract documents may not be pre-existing in the computer system. However, in practice it is often required to prepare contracts based upon the contract documents received from the external parties. An aspect of the present invention is that it overcomes this drawback of the conventional techniques.

These and other various objects, features, advantages, and benefits of the present invention can be more fully appreciated with reference to the detailed description and accompanying drawings that follow.

BRIEF DESCRIPTION OF THE DRAWINGS

Embodiments of the present invention are illustrated in the figures of the accompanying drawings. These figures are exemplary and they should not unduly limit the scope of the invention. The figures are provided to aid thorough understanding of the invention. Based on the present teachings, person of ordinary skill in the art can contemplate various alternatives, variations and modifications to the illustrated embodiments within the scope of the invention disclosed herein.

DETAILED DESCRIPTION OF THE INVENTION

The following detailed description of the invention refers at various places to the accompanying drawings and specific environments, applications, platforms, examples, computer screenshots, and implementations. The detailed description is provided for thorough understanding of the present invention and is illustrative rather than limiting.

Figure 1:
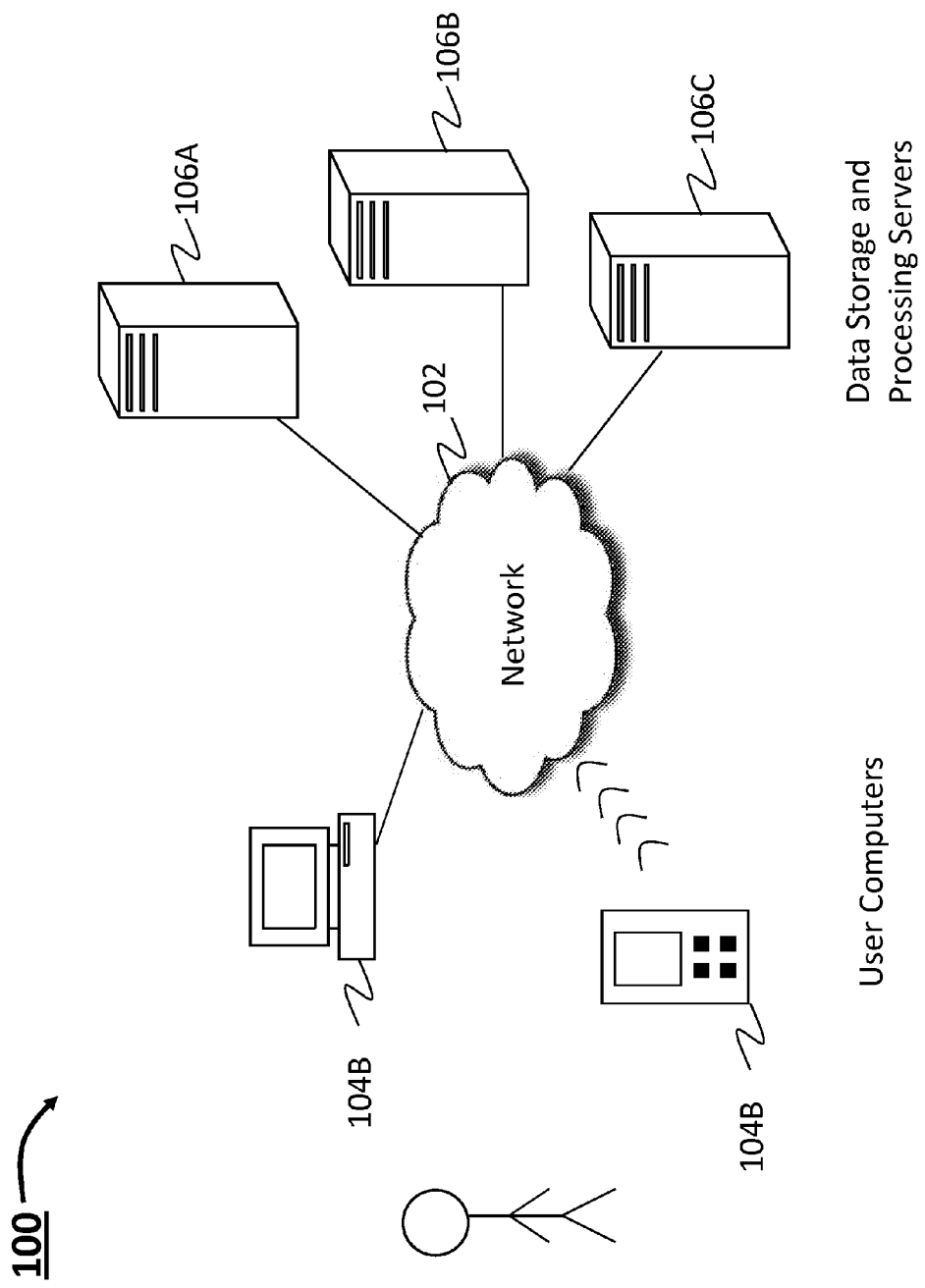
FIG. 1 illustrates an exemplary computer network environment appropriate for a specific embodiment of the present invention.

FIG. 1 illustrates an exemplary networked computer system 100 which can provide an environment to practice certain specific embodiments of the present invention. As shown in FIG. 1, multiple end user computer systems 104 and multiple server computer systems 106 can be coupled to a computer network 102. For example, the computer network 102 can be a private network of the organization. In alternative embodiment, the computer network 102 can include the local area network (LAN); and in yet an alternative embodiment it can include the Internet. The end user computer systems 104 can include without limitation desktop computers, laptop computers, personal digital assistant (PDAs), and smart phones. The computer systems 104, 106 etc. can exchange information using the computer network 102.

The servers 106 store digitized content which can be accessed (e.g., read, downloaded, searched, changed etc. as appropriate) over the computer network. A specific portion of the content is often identified using a hyperlink. The content stored in one server can also be accessed by another server and by the end user computer system. Popular techniques for accessing the content include HTTP and (HyperText Transfer Protocol) and HTTPS (HypterText Transfer Protocol Secure), though other techniques can also be used. Access to some portions of the content may require authentication and/or authorization for access.

Depending upon embodiments of the present invention, the servers 106 and the computer systems 104 can be configured to perform certain acts. For example, the servers 106 and the computer systems 104 can include software which can facilitate performing these acts. These acts can include various acts performed by the "user interaction module", by the "information extraction module", by the "contract authoring module", for interaction between the "user interaction module" and the "information extraction module", etc.

Figure 2:
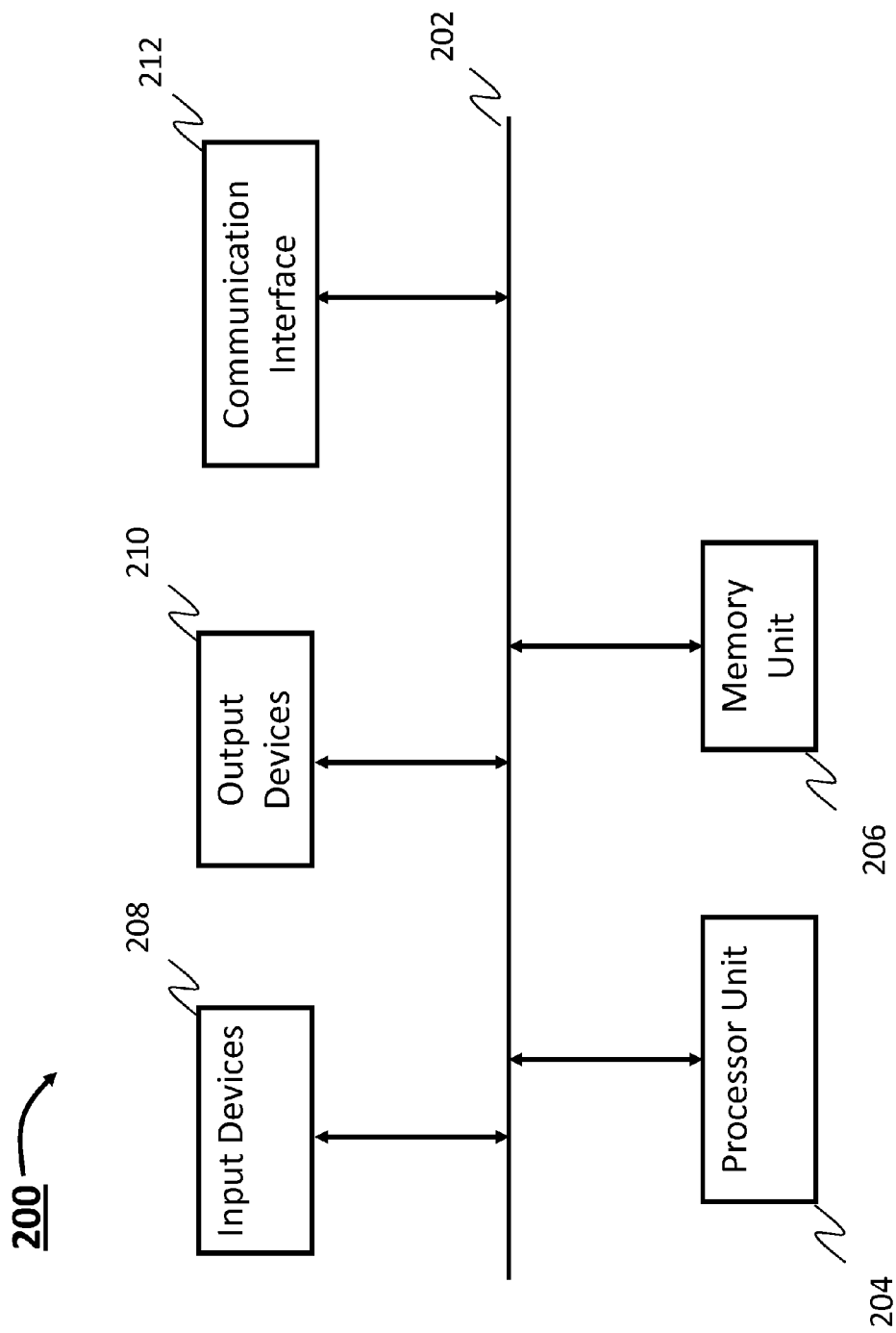
FIG. 2 illustrates an exemplary computer apparatus that can provide a computing platform to practice specific embodiments of the present invention.

FIG. 2 illustrates an exemplary implementation of any of the servers 106 or any of the end user computer system 104, according to an embodiment of the present invention. The bus 202 permits communication among the components. The processor unit 204 may include one or more microprocessors, microcontrollers, RISC processors, CISC processors etc. The processor unit can interpret and execute instructions. The memory unit 206 may include any type of one or more volatile storage devices, for example, random access memory (RAM). The memory unit 206 may in addition or alternatively include any type of one or more persistent storage devices, for example read only memory (ROM), read write memory, hard disc, flash memory etc. The memory unit stores information and instructions for execution by the processor unit 204.

The input devices 208 may include one or more mechanisms that permit an operator to input information, such as a keyboard, mouse, pen, magnetic drives, optical drives etc. The output devices 210 may include one or more mechanisms that output information to the operator, including a display, a printer, a speaker etc. The communication interface 212 may include any transceiver mechanism that enables communication with other devices and systems via a network. For example, the communication interface can include Ethernet interface, optical network interface, wireless interface etc.

Figure 3:
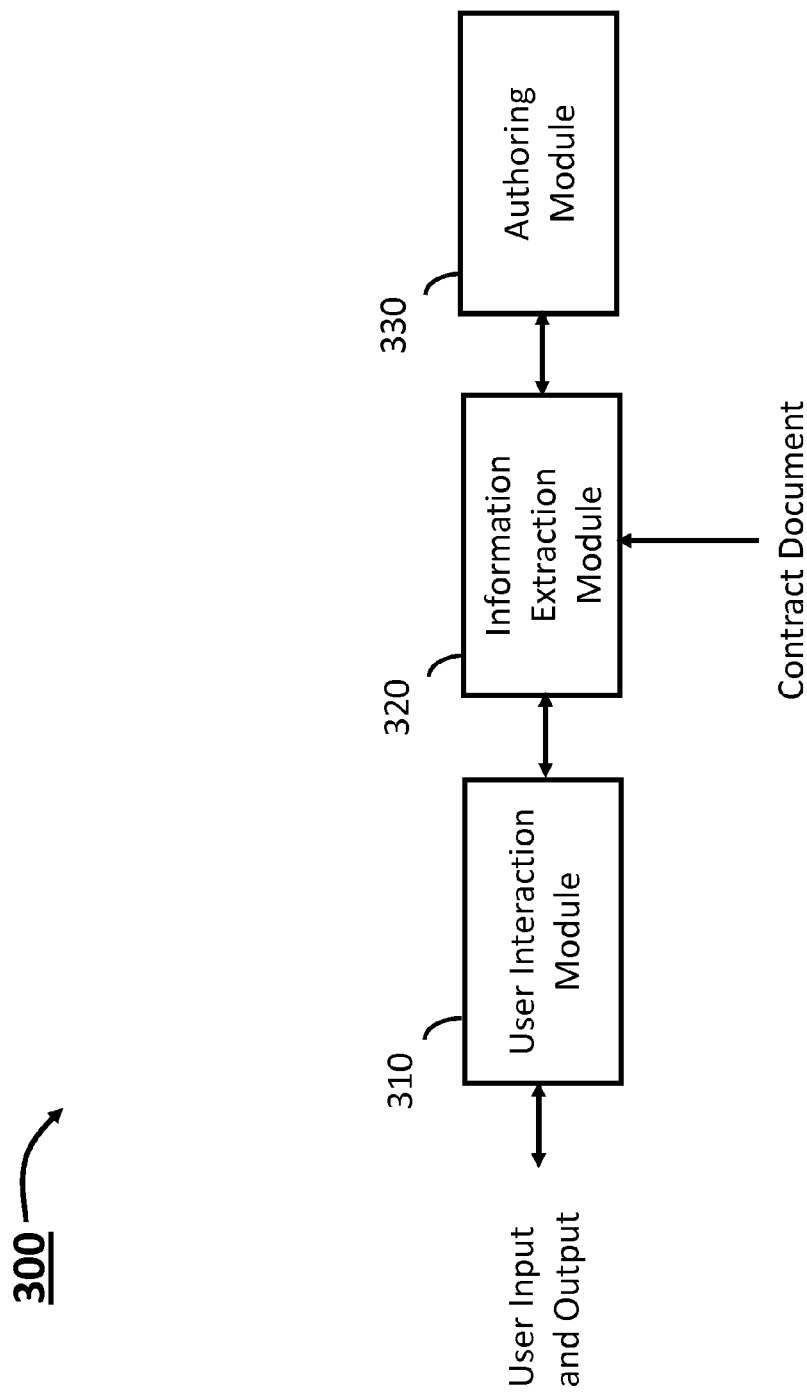
FIG. 3 illustrates an exemplary schematic of a system for contract authoring according to a specific embodiment of the present invention.

FIG. 3 illustrates an exemplary schematic 300 of a system for contract authoring according to an embodiment of the present invention. As shown in FIG. 3, the system 300 comprises various modules. Each of these modules can be a hardware module, a software module, or combination thereof. Moreover, depending upon the embodiment, each of the modules can reside on a single computer system or can be distributed across a plurality of interconnected computers. The user interaction module 310 provides interface between user and machine, and performs acts such as receiving input from user and providing output to the user. In a specific embodiment, the user interaction modules implements user interface using a web browser. The information extraction module 320 can process the contract documents to extract and classify the portions of information in the documents. The contract authoring module 330 can perform various acts associated with assembling or preparing a contract.

Figure 4:
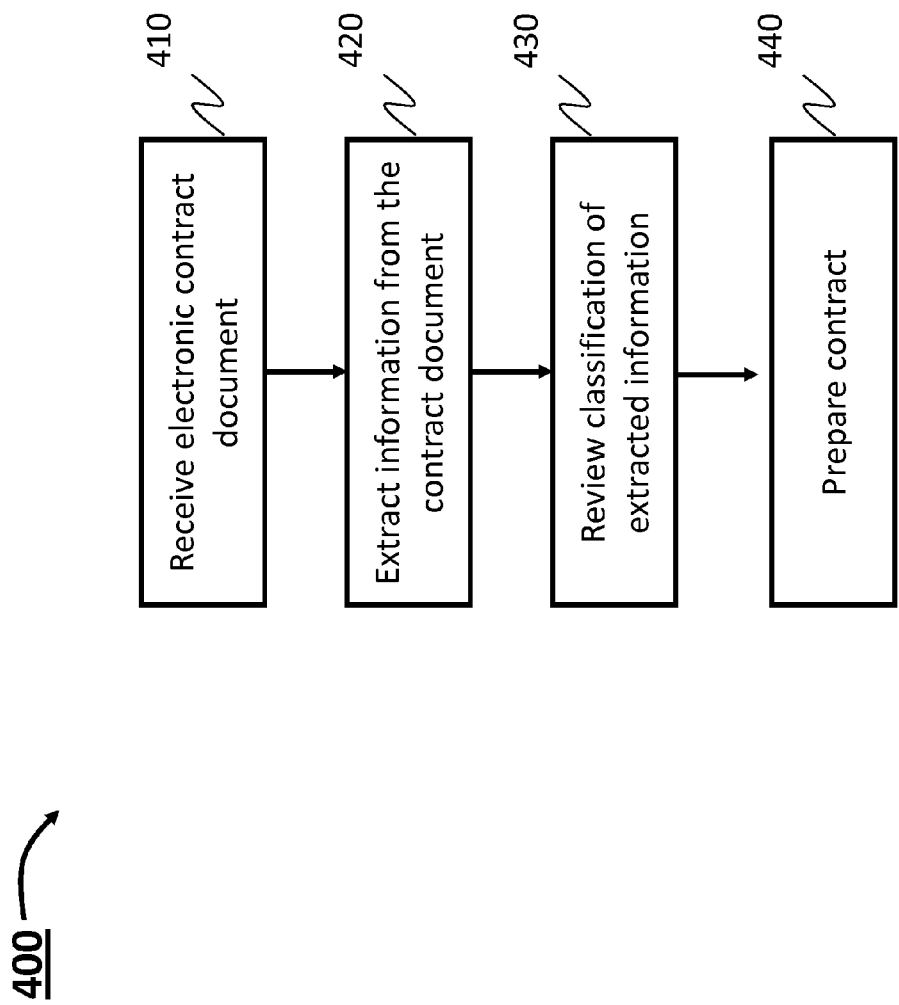
FIG. 4 illustrates an exemplary flow of steps in a method for contract authoring according to a specific embodiment of the present invention.

An exemplary flowchart 400 illustrating steps in a method for contract authoring according to an embodiment of the present invention is shown in FIG. 4. As shown in FIG. 4, the method can receive a contract document in electronic form, at step 410. Preferably, the contract document is received from the external party. Notably, the template of the contract document is not pre-existing in the system. The template for a document in this context refers to a database of different portions of text in the document such as clauses, clause titles, section titles, contract titles, definitions, etc., which can be used to assemble a new contract. Preferably, the template facilitates selecting various portions of text from the database to construct the contract document. According to an embodiment of the present invention, the receiving of the external contract document can be facilitated by way of input from the user in a computer screen (for example, as facilitated by the user interaction module 310). For example, the user can input reference to location in the computer memory (e.g., file path) or to location in the computer network (e.g., URL) from where the external contract document can be received.

Figure 5:
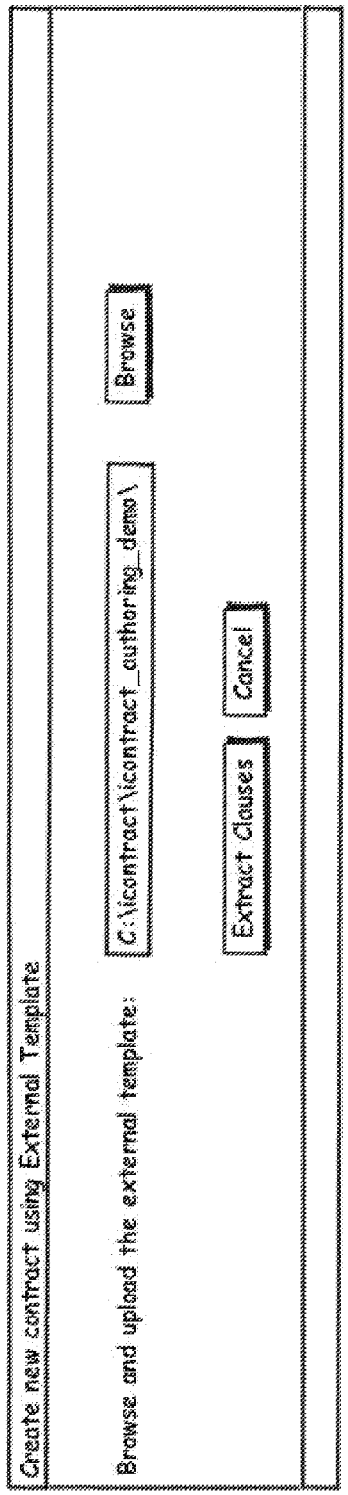
FIG. 5 illustrates an exemplary computer screenshot which facilitates receiving external contract documents into the contract authoring system, according to an embodiment of the present invention.

An exemplary computer screenshot to facilitate receiving the external contract document is illustrated in FIG. 5. Preferably, the received contract document is in a text readable form such as Microsoft Word document, PDF document, Rich Text Format (RTF), Text Format (txt), etc. Alternatively, techniques such as optical character recognition (OCR) can be employed to convert the received contract document into text readable form.

Figure 6:
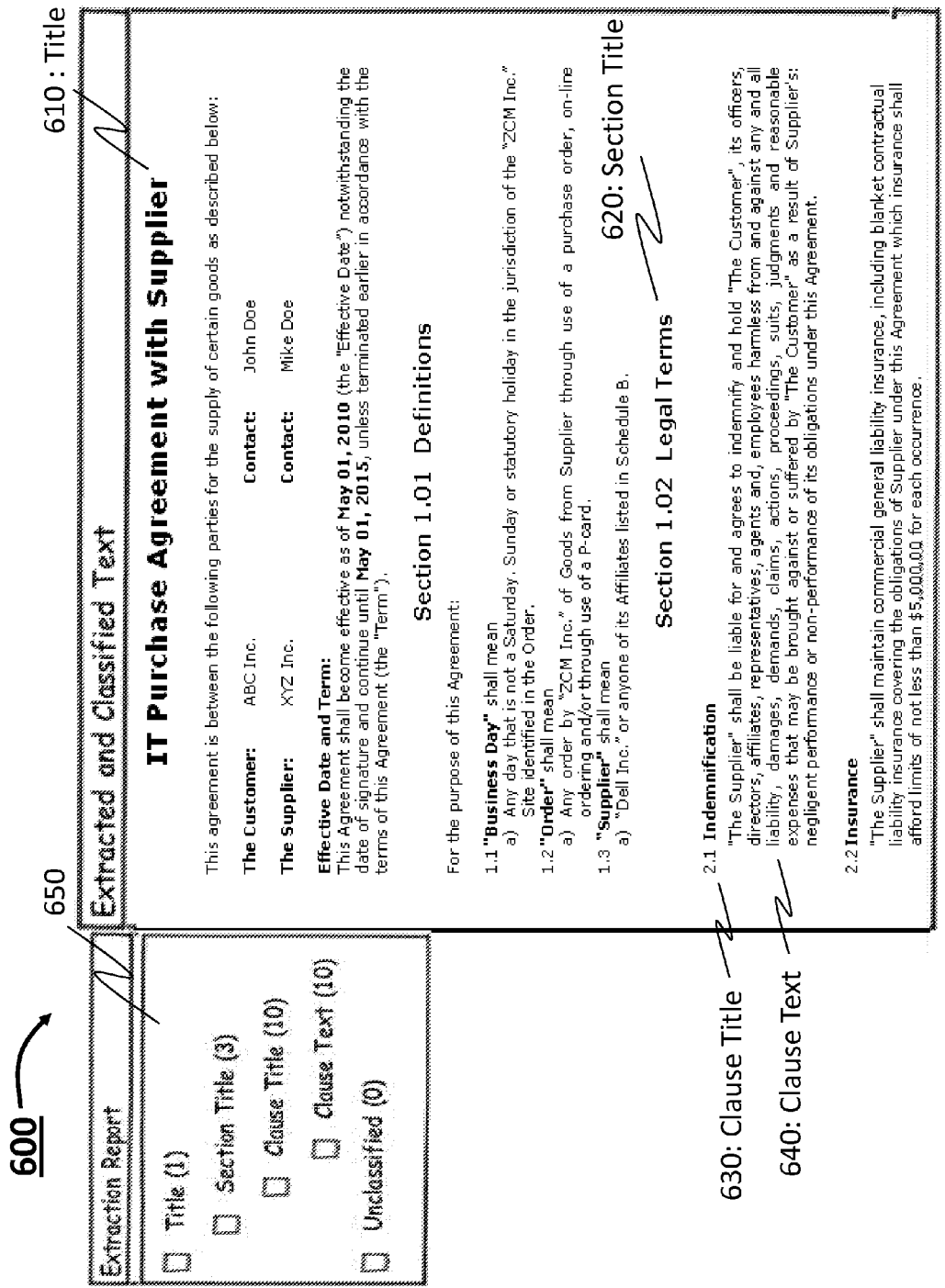
FIG. 6 illustrates an exemplary computer screenshot which facilitates presentation of information extracted from the contract document to user, according to an embodiment of the present invention.

The received external contract document typically comprises a plurality of clauses arranged in flowing paragraphs spanning multiple pages. The clauses can include contractual terms, payment terms, references to other documents, etc. In a specific embodiment, the clauses are organized into sections and titles for improved readability. An exemplary contract illustrated in FIG. 6, shows contract title (610), section title (620), clause title (630), and clause text (640).

At step 420, the method can process the received contract document in order to extract clauses, sections and titles from it. In an embodiment of the present invention, the information extraction module (320) performs this extraction task. For the purpose of information extraction, the present invention utilizes certain heuristics. The heuristics can be pre-configured in the system. Users can also provide their own heuristics or alter the pre-configured heuristics to suit particular contract document.

An exemplary heuristic technique for information extraction is described below:

1. The smallest unit of the contract is a clause.
2. Clause may have clause title.
3. Clauses may be grouped into sections. The section may have a title.
4. A contract as a whole may have a title.
5. Clauses, clause titles, section titles, and contract title can be distinguished on the basis of font style. The font style can comprise one or more of font face, font family, font size, and font texture (bold, underlined, italics, etc.).
6. The text style that is found most frequently can be considered as clause text.
7. The text style that is found to precede the clause text most frequently can be considered as the clause title.
8. If there is no specific text style preceding the clause text, check if the clause title is a group of words in capital case at beginning of the clause text.
9. If clause title is found, then the text style that is found to precede the clause title most of the times can be considered to be the section title.
10. The contract title can be the text which is found at the beginning of the document, or it can be the text with the largest font size in the document. Alternatively, the title can be identified as the text at the top of the page.

Note that the specific heuristics described above is exemplary only. Alternative heuristics can also be used in addition to or in lieu of the specific technique described above. For example, in an embodiment, to the text string pattern matching can include identifying specific key words (e.g., WHEREAS, Definitions, Indemnification, Payment, etc.) in the contract document to identify types for certain portions of text in the document. In an embodiment, the system can log various text string patterns that are manually classified by the user, based on which the system can generate new or modified versions of the existing heuristics.

In an embodiment of the present invention, the extracted information can be presented to user in a classified form. An exemplary computer screenshot of such information presentation is illustrated in FIG. 6. As shown in the figure, in this embodiment the structure of the contract that is extracted or interpreted as described above, is presented in the form of tree structure (650).

At step 430, the method facilitates the user to review the extracted information. It provides for the user to review the classification of text, rectify any mis-classified text, assign category to unclassified text and like.

Moreover, at step 440, the method facilitates contract authoring. For contract authoring, user can select, delete, and modify portions of text that are extracted and classified as above. User can also add additional portions of text to the contract template. Advantageously, the extraction and classification performed on external contract documents according to the present invention makes such contract authoring efficient, for example, compared to directly working with original external contract document. Such templates can also facilitate creation of future contracts which, for example, resemble to present contracts.

Accordingly, the present invention provides contract authoring system and method which can use external contract documents as basis. While specific embodiments are described herein, alternative embodiments will be apparent to person of ordinary skill in the art, in which one or more acts described herein can be modified, performed in different order, or omitted; without departing from the spirit of the invention. Moreover, one or more acts can be added to those described herein. Such obvious alternatives and modifications are included within the scope of the present invention.

What is claimed is:

1. A computer based system for contract authoring, comprising:
   a processor unit;
   a computer screen operably associated with the processor unit;
   a non-transitory computer readable medium operably associated with the processor unit, the computer readable medium storing instructions executable by the processor unit to perform the steps of:
   receiving an unprocessed external contract document in electronic form, the external contract document comprising a plurality of text portions relating to a plurality of contract component types, wherein any contract component type is one of a contract title, a section title, a clause title, and a clause text;
   accessing a heuristic system describing a plurality of text patterns which identify with the plurality of the contract component types;
   processing the external contract document utilizing the heuristic system to automatically identify and extract the plurality of the contract component types for the plurality of the text portions in the external contract document;
   wherein the heuristic system is selectively operable to automatically identify and extract at least one title from the external contract document;
   displaying the external contract document on the computer screen; and
   simultaneously displaying a separate indication of the plurality of the contract component types that have been identified and extracted in the processing step as being associated with the plurality of the text portions in the external contract document;
   wherein the indication includes a tree structure showing separate component types and their inter-relationships that have been identified and extracted in the processing step;
   wherein the tree structure comprises total number of each separate component type that has been identified and extracted in the processing step.

2. The system of claim 1 wherein the processing of the external contract document is based at least upon a font style and a relative frequency of the font style in the external contract document.

3. The system of claim 2 wherein the processing of the external contract document is based at least upon a relative frequency of a font style that is different from the font style of the clause text and that precedes the clause text.

4. The system of claim 1 wherein the processing of the external contract document to identify and extract the clause text is based at least upon identifying a font style that occurs a highest number of times in the contract document.

5. The system of claim 4 wherein the processing of the external contract document to identify and extract the clause title is based at least upon identifying a font style that is different from the font style of the clause text and that precedes the clause text a highest number of times in the contract document.

6. The system of claim 5 wherein the processing of the external contract document to identify and extract the contract title comprises identifying a font style with a font size larger than any other font style in the contract document.

7. The system of claim 1 wherein the computer readable medium stores further instructions executable by the processor unit to perform the step of receiving user input to re-classify at least one portion of text in the contract document from a first component type to a second component type.

8. The system of claim 1 wherein the computer readable medium stores further instructions executable by the processor unit to receive an action input to prepare a new contract document.

9. The system of claim 8 wherein the action input comprises at least one selected from the group consisting of selecting a portion of text, deleting a portion of text, modifying a portion of text, and adding a portion of text.

10. The system of claim 9 wherein the action input is provided by a user utilizing the indication of the plurality of the contract component types that have been identified and extracted in the external contract document.

11. A computer based method for contract authoring, comprising:
    providing a processor unit;
    providing a computer screen operably associated with the processor unit;
    providing a non-transitory computer readable medium operably associated with the processor unit, the computer readable medium storing instructions executable by the processor unit to perform the steps of:
    receiving an unprocessed external contract document in electronic form, the external contract document comprising a plurality of text portions relating to a plurality of contract component types, wherein a contract component type is one of a contract title, a section title, a clause title, and a clause text;
    accessing a heuristic system describing a plurality of text patterns which identify with the plurality of the contract component types;

processing the external contract document utilizing the heuristic system to automatically identify and extract the plurality of the contract component types for the plurality of the text portions in the external contract document;

wherein the heuristic system is selectively operable to automatically identify and extract at least one title from the external contract document;

displaying the external contract document on the computer screen; and simultaneously displaying a separate indication of the plurality of the contract component types that have been identified and extracted in the processing step as being associated with the plurality of the text portions in the external contract document;

wherein the indication includes a tree structure showing separate component types and their inter-relationships that have been identified and extracted in the processing step;

wherein the tree structure comprises a total number of each separate component type that has been identified and extracted in the processing step.

12. The method of claim 11 wherein the processing of the external contract document is based at least upon a font style and a relative frequency of the font style in the external contract document.

13. The method of claim 12 wherein the processing of the external contract document is based at least upon a relative frequency of a font style that is different from the font style of the clause text and that precedes the clause text.

14. The method of claim 11 further comprising authoring a contract document utilizing the indication of the plurality of the contract component types that have been identified and extracted in the external contract document.

* * * * *